3,202,719
REFINING OF PHENOLS
Donald C. Jones, Pittsburgh, Pa., assignor to Consolidation Coal Company, Pittsburgh, Pa., a corporation of Pennsylvania
Filed July 3, 1961, Ser. No. 121,403
6 Claims. (Cl. 260—627)

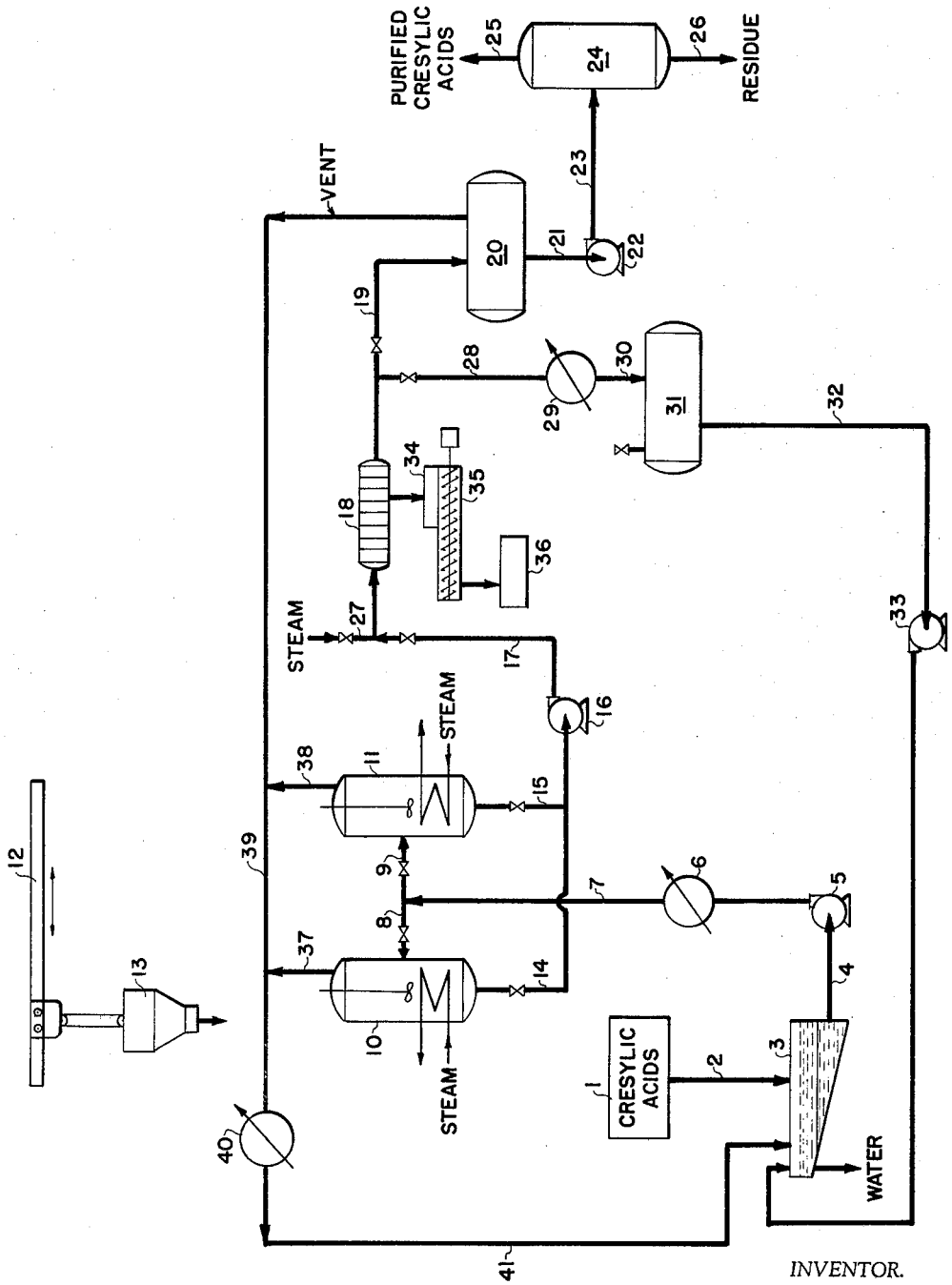

This invention relates to the refining of phenols. More particularly, it relates to the treatment of commercial phenolic compounds with an acid-activated chemisorbent clay to produce colorless, color-stable phenols which are further useful in preparing colorless, color-stable aryl esters of phosphoric acid.

The phosphoric acid esters made by the interaction of phenols and orthophosphoric acid are excellent plasticizers. However, it has been found that unless the phenols used in their preparation are free from impurities, the resulting esters will discolor upon standing, particularly upon exposure to air, heat, or sunlight. This discoloration is a serious disadvantage in many applications of these esters.

The impurities causing discoloration of the phosphoric acid esters are not wholly known. They do not always correspond to those which cause discoloration of the commercial phenolic compounds. Thus a phenol may appear water-white and nevertheless yield a phosphoric acid ester that is subject to discoloration and is unacceptable. Conversely, it has been found that some phenols which are still slightly discolored even after treatment with strong acid to remove impurities, nonetheless form acceptable colorless, color-stable phosphoric acid esters. The impurities present vary in amount and type depending upon the source of the commercial phenols used, but are generally believed due to any of various undesirable substances such as sulfur-containing contaminants, nitrogen bases, neutral oils, and the like. These impurities are removable with difficulty, since apparently even trace amounts of certain ones remaining in the phenols will cause subsequent discoloration of the phosphoric acid ester. Various processes have been proposed for eliminating these impurities. In U.S. Patent 2,113,951 a distillation treatment of the phenols with a strong acid is proposed. In U.S. Patent 2,301,709, there is shown an initial treatment of the phenol with a mineral acid followed by a distillation treatment with a concentrated alkali solution. In U.S. Patent 2,446,250, a distillation treatment of the phenols in the presence of anhydrous aluminum chloride is proposed.

The foregoing methods have been found lacking in various respects which militate against their full commercial utilization. For example, while sulfuric acid treatment of the phenols is effective in providing a colorless, color-stable phosphoric acid ester, the sulfuric acid is highly corrosive and also reduces the yield of phenolic compounds obtained because of sulfonation side reactions. Using the same quantity of phosphoric acid in place of sulfuric acid is less effective in providing a colorless, color-stable ester. Increasing the amount of phosphoric acid used may increase corrosion effects and also results in an increase in the amount of moisture being formed in the refined phenols. This moisture is commercially undesirable because of reduced ester yield. Furthermore, for treatment with acid to be effective and economical, the phenols must be initially free from any water. In addition, while sulfuric acid treatment will be successful in providing a colorless, color-stable phosphoric acid ester, this treatment with strong sulfuric acid frequently results in discoloration of the phenolic compounds or in the production of decolorized phenolic compounds which are not color stable. Thus such phenols will lack utility for many other applications. Based on commercial considerations, a need exists for a process for treating commercial phenolic compounds which will produce colorless, color-stable phenolic compounds which are at the same time suitable as a feedstock for preparing colorless, color-stable phosphoric acid esters, which process may be applied to "wet" phenols, does not deleteriously affect the yield of phenolic compounds or of phosphoric acid ester, and is non-corrosive.

Accordingly, it is an object of the present invention to provide a method for refining commercial phenolic compounds for use in making phosphoric acid esters, which method is free from the disadvantages inherent in prior art processes.

It is an additional object to provide a non-corrosive method for purifying commercial phenolic compounds to produce colorless, color-stable phenolic compounds suitable for use in preparing colorless, color-stable phosphoric acid esters.

In accordance with this invention, commercial phenolic compounds normally unsuitable in the unrefined state for forming commercially acceptable colorless, color-stable phosphoric acid esters are refined and rendered acceptable for subsequent esterification by the combined steps of intimately contacting the phenolic compounds with an acid-activated chemisorbent clay together with distillation of the phenolic compounds. The distillation step may either precede or follow the clay treatment step. Both the step of distillation and the step of chemisorbent clay treatment are required to obtain colorless, color-stable phosphoric acid esters. Also, in order to obtain phenolic compounds which are also colorless and color-stable, and which are suitable for use in preparing colorless, color-stable phosphoric acid esters, both the distillation and the chemisorbent clay treatment are required. Preferably, the clay is in finely divided form, at least 50 percent by weight passing through a 325-mesh U.S. standard sieve. Intimate contact between the clay and phenols is preferably most effectively obtained in a batch contactor rather than by percolation of the phenols through a packed clay bed.

The selection of a chemisorbent clay is a basic factor in achieving results of practical significance and of commercial utility. The chemisorbent clay used must be highly selective in its activity, effective in low concentrations in eliminating undesired impurities while at the same time not deleteriously affecting commercial phenolic compounds with respect to either purity or yield. It is further desirable that the chemisorbent clay be relatively inexpensive or have a sufficiently long life with respect to reuse. In addition, it must be non-corrosive, indifferent to the presence of moisture in the cresylic acids, and readily recoverable from the system under normal processing procedures.

Meeting the foregoing requirements, effective chemisorbent agents useful in the practice of this invention consist of the acid-activated chemisorbent clays. Apparently because of the unique nature of the impurities present in commercial phenolic compounds, the use of an acid-activated chemisorbent clay is particularly effective in refining these phenols. Thus certain impurities will remain in trace amounts and appear to respond to chemical treatment only. Other impurities are readily removed by physical adsorption. The combination of physical adsorption, chemical treatment, and distillation therefore provides colorless, color-stable phenolic compounds which are also effective for preparing colorless, color-stable phosphoric acid esters.

Exemplary and preferred clays are those acid-activated clays of the non-swellable bentonite type. Particularly preferred of these bentonite clays are the acid-activated montmorillonitic clays as hereinafter defined. Referring to the clay-mineral classification of R. E. Grim, "Clay Mineralogy" (McGraw-Hill, 1953), the montmorillonitic clays particularly useful in the practice of this invention are of a micaceous or platy structure, and are three-layered. Further, they contain minerals of the montmorillonite group, principally montmorillonite. In addition, to be effective in the process of this invention, these clays must be acid-activated and acidic in nature. The acid strength of solid materials can be readily determined by the method of Cheves Walling, J. Am. Chem. Soc., 72, 1164 (1950) or by other methods known to the art. Acid-activated montmorillonitic clays are suitably acidic for the practice of this invention. Only acid-activatable non-swelling bentonites, or sub-bentonites, and particularly those containing montmorillonitic minerals, have been found useful in the practice of this invention to obtain the acid-activated clays. These bentonites are relatively inactive in the untreated state.

Specifically excluded, on the basis of mineralogical classification, are those clays principally containing minerals of a fibrous or chain-like structure, the palygorskite group; amorphous minerals, the allophane group, and two-layered minerals, the kaolinite group. Also excluded from the practice of this invention, on the basis of functional classification, are those naturally adsorbent clays, usually designated as "fuller's earth," which are not in an acid-activated state. The term "fuller's earth" generally lacks genetic or mineralogical significance and is used broadly in this field. Thus different fuller's earths are known which are composed of attapulgite, montmorillonite and kaolinite. These earths are naturally active and ordinarily most of them do not respond satisfactorily to acid activation. Specifically excluded from the practice of this invention are those readily swellable fuller's earths of the bentonite type, e.g., the "Wyoming" or swelling-type bentonites, which can be acid activated only with considerable difficulty.

The preparation of acid-activated montmorillonitic clays is well known. A discussion of the preparation of these clays appears in "Encyclopedia of Chemical Technology," vol. 4, pages 53–57 (Interscience Publ., 1949). Acid-activated montmorillonitic clays obtained by the acid activation of acid-activatable nonswelling sub-bentonites are commercially available under the trade names of "Filtrol," "Super Filtrol," "KSF Clay," and the like.

Somewhat surprisingly, the naturally active fuller's earths, which effectively decolorize many oils, are unsuitable for the practice of this invention. Further, despite the fact that acid-activated clays are known to the art as catalytic agents in the cracking of gas oil and also as polymerization initiators, they are nonetheless highly effective in selectively eliminating undesired impurities from the phenols without splitting, polymerizing, degrading, or otherwise adversely affecting the commercial phenolic compounds.

In practicing this invention in its most economical and preferred aspects, with full regard to commercial considerations, I have found that the acid-activated chemisorbent clay is particularly effective when used in fine-mesh adsorbent size, 100 percent through 100 mesh and at least 50 percent by weight through 325 mesh, and when used in a batch-contacting process as compared with a percolation technique. While my invention is not to be considered confined thereto, ordinarily that acid-activated chemisorbent clay will be selected which affords the most suitable combination commercially with respect to price, availability, and effectiveness in low concentration. Inas much as the acid-activated montmorillonitic clays are particularly suitable in the practice of this invention, there will ordinarily be little economic or other commercial incentive for using other more expensive chemisorbent acid-activated nonswellable bentonite-type clays.

Representative properties and a representative analysis of a commercially suitable clay, prepared by the acid activation of a montmorillonitic sub-bentonite and commercially available as "Filtrol No. 20" is shown below:

Properties:  Representative analysis
(1) Particle size analysis—
   Roller method—
      0–5 microns _____percent__   5
      0–20 microns _____do____  35
   Screen (ASTM Standard Test C325–56)—
      Through 100 mesh _____percent__ 100
      Through 200 mesh _____do____  90
      Through 325 mesh _____do__  75
(2) Density—
   Bulk density (settled) _____lb./cu. ft__  45
   Particle density _____  1.3
   Specific gravity (after heating to
      1000° F.) _____ 2.65
(3) Miscellaneous physical properties—
   Free moisture _____percent__ 15.0
   Free and combined moisture (loss
      at 1700° F.) _____do____ 21.0
   Surface area B.E.T. method _sq. m./gm.__ 275

*Chemical constituents (volatile-free basis, percent by wt.)*

$SiO_2$ _____ 70.9
$Al_2O_3$ _____ 17.0
$Fe_2O_3$ _____ 3.9
$MgO$ _____ 3.2
$CaO$ _____ 1.6
$SO$ _____ 2.0
$K_2O=Na_2O$ _____ 1.0
$TiO_2$ _____ 0.6

In order to reduce the treatment costs, a minimum amount of acid-activated chemisorbent clay will be used, i.e., that amount sufficient to obtain and maintain the desired color and color stability of the phenolic compounds and of the phosphoric acid esters formed therefrom. While the exact amount of the clay used will generally depend upon the particular clay selected, the reaction conditions, and the particular commercial phenolic compounds or fraction of commercially segregated phenols being treated, this total amount of clay will always be less than 20 percent by weight of the phenols. In practice, a preferred amount of clay for treating the phenols to achieve acceptable color stability of the ester will be between 3 and 10 percent by weight. With certain commercial phenols and clays, recycle of the clay for reuse in the process is feasible and contemplated. For most commercial applications, about 5 percent by weight of the clay used for a single treatment results in an economic optimum for the process.

A finite contact time between the acid-activated chemisorbent clay and the commercial phenols is required. Where a percolation technique is used, and the clay is in the form of granules or pellets, longer contact times will be required for completion of the chemical reaction that is believed to occur. For a batch contactor process in which the cresylic acids are intimately agitated with the finely divided clay, the reaction will be completed more rapidly. Thus, further dependent on temperature, higher temperatures requiring shorter contact times, a finite contact time between 5 minutes and 10 hours is contemplated.

Where the commercial phenolic compounds are but slightly discolored, the treatment may be performed at a lower temperature, e.g., room temperature. To obtain a more vigorous reaction with highly discolored phenols, agitation at close to the reflux temperature of the phenols is preferred. Thus a temperature between 25 and 225° C. may be used in this process.

Generally, in purifying an unrefined, discolored commercial phenolic compound, optimum results are obtained by preferably using from 3 to 20 percent by weight of a finely divided acid-activated montmorillonitic clay of −100 mesh size and at least 50 percent of −325 mesh size in intimate contact with the phenols in a batch contactor at a temperature between 150 and 200° C. for about 10 minutes to 3 hours.

By the terms "commercial phenolic compounds," "phenols," "cresylic acids," and "tar acids" as used herein, including the claims, reference is made to those caustic-soluble phenols obtained by the thermal treatment of hydrocarbonaceous materials such as petroleum, coal, lignite, and the like. Commercial phenolic compounds are conveniently obtained from the high temperature coking of coal, low temperature carbonization of coal, extraction from petroleum naphtha made by the commercial cracking of crude petroleum, etc. Cresylic acid distillate fractions generally consist of mixtures of phenols, cresols, xylenols, and higher boiling alkyl phenols. The specific distribution of phenolic isomers present depends upon the origin of the starting material and upon the particular distillate fraction selected. A preferred cresylic acid distillate fraction has a boiling range of at least 30 degrees between 180 and 230° C.

In practicing this invention, the required amount of finely divided clay is added to the commercial cresylic acid distillate fraction and heated for a specified period of time. The mixture is then cooled and filtered, followed by distillation of the cresylic acid filtrate. For obtaining satisfactory color of the cresylic acid distillate fraction and of the phosphoric acid, the distillation may either precede or follow the clay treatment step. It is generally more convenient in order to obtain a colorless, color-stable cresylic acid which at the same time is suitable for the preparation of a colorless, color-stable phosphoric acid ester for the distillation to follow the clay treatment.

In practicing a preferred aspect of this invention, a cresylic acid distillate fraction which has been partially dried is contacted with between about 5 and 10 percent by weight of a finely divided acid-activated montmorillonitic clay (e.g., Filtrol No. 20) for between 10 minutes and 3 hours in a batch contactor at or just below atmospheric reflux temperatures (150–200° C.) followed by cooling to between 50 to 75° C., filtration, followed by flash distillation or fractional distillation of the filtrate to produce a colorless, color-stable cresylic acid distillate fraction.

The cresylic acids treated in accordance with the process of this invention show only a very slight change in color after a storage period of three and a half months. Untreated cresylic acids similarly stored are markedly discolored. The recovery of cresylic acids treated in accordance with this invention is substantially about 90 percent, and with appropriate recycle approaches almost 100 percent. Such yields are ordinarily not obtainable with an acid-treatment process because of the occurrence of undesired esterification reactions. Furthermore, the clay treatment as used does not have any deleteriously corrosive effect on the equipment used and does not require that the cresylic acids be substantially dry prior to treatment. Both corrosion effects and predrying requirements are present with acid-treatment processes.

For a better understanding of the invention, its objects, features and advantages, reference should be had to the sole figure of the accompanying drawing which is a diagrammatic illustration of an apparatus adapted to the practice of a preferred embodiment of the process of this invention.

Referring to the drawing, in which the process of this invention is integrated into a commercial operation for the processing of cresylic acids, sulfur-free wet cresylic acids 1 are passed by way of a conduit 2 to a decanter 3 where a substantial amount of the water present is removed. Generally, the cresylic acids leaving decanter 3 contain between 10 and 15 percent by weight of water. They are passed by way of a conduit 4 and a pump 5 through a preheater 6 where their temperature is raised to approximately 175° C. The cresylic acids are then fed by way of a conduit 7 and then by way of either of valved conduits 8 and 9 to either of batch contactors 10 and 11, respectively. The clay treatment and filtration steps are set up for batch operation. However, as illustrated, this process may be readily integrated in an over-all continuous process for the purification of cresylic acids.

By means of an overhead conveyor 12, the chemisorbent clay is fed to either of contactors 10 and 11 through a hopper 13. Typically, for intimate contact, the acid-activated chemisorbent clay used is preferably a finely divided acid-activated montmorillonite clay having a particle size distribution of at least 50 percent passing through a 325-mesh screen (ASTM test C325–56). The clay is ordinarily not predried. On a wet basis, a typical contactor batch contains about 5 percent by weight of clay and about 95 percent by weight of cresylic acids. After drying, about 15 percent by weight of water will be lost. Thus about 7 percent by weight of clay on a dry basis and 93 percent by weight of dry cresylic acids remain. After treatment at a temperature between 150 and 200° C. for about ½ to 1 hour, superheated steam being circulated through the contactor vessels to maintain the temperature and further dry the reactants, the batch of clay and cresylic acids is discharged through the appropriate conduit of either of valved conduits 14 and 15 and led by way of a pump 16 and valved conduit 17 to a pressure filter 18. The treated cresylic acids recovered as a filtrate from pressure filter 18 are passed by way of a valved conduit 19 to a vented surge drum 20 where they are discharged at a constant rate through a conduit 21, a pump 22, and a conduit 23 to a still 24.

Where it is desired to recover the clay-treated cresylic acids in still 24 without further fractionation, or fractionation of the cresylic acids has been accomplished prior to the clay-treatment step, the cresylic acids are flash-distilled and recovered as an overhead product through a conduit 25, the non-distillable residue being removed through a conduit 26. Alternatively, the cresylic acids in still 24 may be fractionally distilled to recover, as respective fractions in order of increasing boiling point, phenol, orthocresol, meta- and paracresols, and higher boiling cresylic acids. This distillation step is required for the obtaining of a suitable cresylic acid feedstock for obtaining colorless, color-stable phosphoric acid esters. At the same time, it provides colorless cresylic acids of improved color stability. While the distillation step may precede or follow the clay-treatment step, certain processing advantages are obtained where the clay-treatment step is performed first. The finer the distillation, i.e., the greater the number of theoretical plates present, the more color-stable will be the cresylic acids obtained.

Before dumping the filter cake from pressure filter 18, any cresylic acids remaining therein are removed by passing steam through a valved conduit 27 into pressure filter 18. The resultant mixture of cresylic acids and steam obtained from the steaming of the filter cake is diverted through a valved conduit 28, conduit 19 being closed, into a water condenser 29. The condensate is then passed through a conduit 30 to a surge drum 31. As shown, the condensate is then returned to decanter 3 by way of a conduit 32 and a pump 33 for recycle in the process. Alternatively, if it is desired to avoid recycling the already clay-treated cresylic acids through the process, the condensate may be taken by way of conduit 32 to a separate decanter (not shown), and wet cresylic acids are then recovered from this decanter, dried, and fed to still 24. Following the steaming operation, the clay is dumped from filter 18 to a bin 34 and led by way of a conveyor 35 to a disposal unit 36.

The recycle stream obtained as an overhead product from contactors 10 and 11 and surge drum 20 consists essentially of a dilute mixture of cresylic acids in steam. This recycle stream is passed from contactors 10 and 11 by way of conduits 37 and 38, and thence by way of a conduit 39 to a condenser 40 of a dehydrator unit for removal of water. It is then returned by way of a conduit 41 to decanter 3.

By utilization of the recycle streams and operation of the process under preferred advantageous operating conditions, less than 1 percent by weight of cresylic acids 1 originally fed to the system is lost. The purified cresylic acids obtained through conduit 25 contain less than 0.2 percent by weight of water and provide a colorless, color-stable cresylic acid feedstock suitable for use in preparing colorless, color-stable cresylic acids.

In evaluating the cresylic acids obtained from the purification process, it has been found that the only wholly reliable method known for determining the acceptability of a cresylic acid as a feedstock for phosphoric acid ester formation is actually by converting a sample of the cresylic acid to the phosphoric acid ester. The ester is conveniently prepared by heating together the cresylic acids, phosphorus oxychloride, and catalyst. The product is then distilled to recover unreacted cresols, crude ester, and residue. The crude ester is refined stepwise by caustic washing to extract unreacted cresols, water washing to remove excess caustic, permanganate treatment to oxidize phosphites to phosphates and eliminate any traces of phosphoric acid, followed by treatment with oxalic acid to reduce manganese dioxide and excess permanganate. The ester is then water washed to remove inorganic salts and excess oxalic acid, dried under vacuum, and filtered. The refined ester is then tested for color, acid number, and permanganate stability.

A highly sensitive test for color which will distinguish between close shades of so-called "water-white" is that using the platinum-cobalt scale to give a Hazen color, a modification of the method originally proposed by A. Hazen, J. Am. Chem. Soc. 18, 264 (1896). The platinum-cobalt color procedure is described in American Society of Testing Materials test method D901–56 and in the publication "Standard Methods for the Examination of Water and Sewage," American Public Health Association, 1946, pages 14–15. Generally, Hazen colors for the phosphoric acid esters as low as obtainable are desired. Thus the terms "colorless" or "water-white" when used strictly refer to a color below 20 Hazen. In actual practice, a working upper limit between 30 and 60 Hazen for a "colorless" ester color may be set depending upon other commercial considerations such as the yield of phosphoric acid ester desired or obtainable from a given sample of cresylic acids.

The color of cresylic acids is frequently evaluated on the Barret tar acid color scale. Colorimetric comparisons are made against standardized dilutions of ferric chloride-cobaltous chloride solutions. The letter designations of the Barrett scale correspond to those of the Hazen scale approximately as follows:

| Hazen | 20 | 30 | 50 | 70 | 100 | 150 | | |
|---|---|---|---|---|---|---|---|---|
| Barrett | B-½ | B-1 | B-1½ | B-2 | B-3 | B-4 | B-8 (C-½) | B-11 (C-1) |

A highly refined "colorless" commercial cresylic acid will have a maximum color on the Barrett scale not greater than C-1. For certain specialized requirements, a color of about B-4 may be required.

The following examples are intended as further non-limiting illustrations of this invention, and set forth the advantageous results obtained by the practice thereof.

EXAMPLE 1

*Effect of clay used*

An unrefined dark-colored commercial cresylic acid distillate fraction boiling over the range of 180 to 230° C. was heated for 10 minutes at reflux temperature (180–190° C.) with 10 percent by weight of different samples of clays, cooled rapidly, and distilled (without filtering) at 50 mm. mercury pressure through a Vigreaux column at low reflux ratio. The distillate was evaluated as a phosphoric acid ester feedstock using the standardized procedure previously described. The results obtained are shown in Table I:

*Table I.—Effect of clay on color of phosphoric acid ester*

| Clay: | Hazen color of ester |
|---|---|
| (1) Highly acidic acid-activated montmorillonite clay (KSF; fine powder; bulk density: 35 lb./cu. ft.) | 35 |
| (2) Acid-activated montmorillonite fluid cracking catalyst (Filtrol 50; −100 mesh) | 35 |
| (3) Acid-activated montmorillonite (Filtrol 13; 100% −100; 90–92% −200; 73–75% −325 mesh) | 40 |
| (4) Acid-activated montmorillonitic bentonite (Filtrol 20; 100% −100; 90–92% −200; 73–75% −325 mesh) | 40 |
| (5) Fuller's earth: ADM bentonite (Wyo. bentonite; −200 mesh) | 100 |
| (6) Fuller's earth: ADM bentonite (Wyo.-Jel; −200 mesh) | 115 |
| (7) Heat-activated Florida fuller's earth (natural Floridin; attapulgite; Florex; 16 x 30 mesh) | 130 |
| (8) Heat-activated Florida fuller's earth (natural Floridin; attapulgite; Florex XXX; 90% −200 mesh) | 160 |
| (9) Georgia fuller's earth (attapulgus; −200 mesh) | 160 |
| (10) Heat-activated Arkansas bauxite (Florite; 16 x 30 mesh) | 160 |
| (11) Heat-activated Arkansas bauxite (Porocel; 10 x 30 mesh) | 160 |

As may be noted from the foregoing, by use of acid-activated adsorbent clays, e.g., the acid-activated montmorillonitic clays (Nos. 1–4), phosphoric acid esters having Hazen colors not greater than 40 were obtained. Use of the activated bauxites (Nos. 10, 11), the attapulgitic fuller's earths (Nos. 7–9), and the swelling type bentonitic fuller's earths (Nos. 5, 6) did not yield esters of satisfactory color.

EXAMPLE 2

*Effect of distillation on color of phosphoric acid ester and of cresylic acids*

Samples of two different cresylic acid distillate fractions were purified by treatment with an acid-activated montmorillonitic clay (Filtrol 20) together with distillation. Comparison was made between samples treated as follows: (1) Distillation only. (2) Clay treatment only. (3) Distillation followed by clay treatment. (4) Clay treatment followed by distillation. Esters were prepared as previously described. Samples of the cresylic acids were aged for several months without benefit of inert gas purging or protection from indirect sunlight. The results obtained are shown in Table II.

Table II.—Role of distillation

[B.C.T.—before clay treatment; A.C.T.—after clay treatment]

COMMERCIAL CRESYLIC ACIDS

| | Crude | | | | Blend of crude and purified | | | | |
|---|---|---|---|---|---|---|---|---|---|
| Sample No | 1-1 | 1-2 | 1-3 | 1-4 | 2-1 | 2-2 | 2-3 | 2-4 | 2-5 |
| Clay treatment: | | | | | | | | | |
| Wt. percent, dry | 0 | 10 | 10 | 10 | 0 | 10 | 10 | 10 | 10 |
| Temp., °C | | 185 | 185 | 187 | | 65 | 65 | 65 | 186 |
| Time, min | | 10 | 10 | 10 | | 20 | 20 | 20 | 10 |
| Distillation treatment | Yes | No | A.C.T. | A.C.T. | Yes | No | B.C.T. | A.C.T. | A.C.T. |
| Ester color (Hazen) | 160 | 160 | 45 | 30 | 160 | 160 | 35 | 40 | 40 |
| Cresylics color (Barrett)—time, months: | | | | | | | | | |
| 0 | B-1 | C-3 | B-½ | B-½ | V-3½ | C-8 | B-2 | B-2 | B-½ |
| 1 | C-2 | C-6 | B-1½ | B-½ | B-9 | C-8 | B-1½ | B-2 | B-½ |
| 2 | C-3 | | | B-1½ | C-1½ | C-8 | B-2 | | B-½ |
| 2½ | | C-7 | B-3 | | C-4 | C-8 | | B-2 | B-1 |
| 3 | C-4 | | B-8 | B-3 | | C-9 | B-2 | B-2 | B-2 |
| 4 | C-7 | | | | C-6 | | | | |

As may be noted from Table II, distillation alone, without clay treatment (Runs 1-1 and 2-1), yielded esters and cresylic acids of poor color and stability. Similarly unsatisfactory results were obtained when clay treatment alone was used, without distillation (Runs 1-2 and 2-2). Where distillation preceded or followed clay treatment, both esters and crsylic acids showed satisfactory color and stability (Runs 1-3, 1-4, 2-3, 2-4, and 2-5). In those runs where clay treatment was performed at reflux temperatures (Runs 1-3, 1-4, and 2-5), the cresylic acids obtained showed best color characteristics initially.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. A process for refining color-unstable phenols obtained by the thermal treatment of hydrocarbonaceous materials and which are normally unsuitable in the unrefined state for forming color-stable phosphoric acid esters having a color below 60 Hazen, which comprises intimately contacting said phenols with a finely divided acid-activated non-swellable montmorillonitic clay, distilling said phenols, and recovering as a distillate fraction refined color-stable cresylic acids suitable for forming color-stable tricresyl phosphate esters having a color below 60 Hazen.

2. A process for refining color-stable phenols obtained by the thermal treatment of hydrocarbonaceous materials and which are normally unsuitable in the unrefined state for forming color-stable phosphoric acid esters having a color below 60 Hazen, which comprises intimately contacting said phenols at a temperature between 25° C. and 225° C., but not above the atmospheric reflux temperature of said compounds, with from 3 to 20 percent by weight of a finely divided acid-activated non-swellable montmorillonitic clay, distilling said phenols, and recovering as a distillate fraction refined color-stable cresylic acids suitable for forming color-stable tricresyl phosphate esters having a color below 60 Hazen.

3. A process for refining color-unstable, undried phenols obtained by the thermal treatment of hydrocarbonaceous materials and which are normally unsuitable in the unrefined state for forming colorless, color-stable phosphoric acid esters having a color below 60 Hazen, which comprises intimately contacting said undried phenols in a batch contactor at a temperature between 150 and 200° C. with from 3 to 20 percent by weight of a finely divided acid-activated non-swellable montmorillonitic clay for a period of time between 10 minutes and 3 hours, filtering the mixture of clay and phenols, distilling the obtained filtrate and recovering therefrom as a distillate fraction refined color-stable dried phenolic compounds suitable for forming colorless, color-stable tricresyl phosphate esters having a color below 60 Hazen.

4. A process according to claim 3 wherein said phenols have a boiling range of at least 30° C. within the temperature range of 180 and 230° C.

5. A process according to claim 3 wherein said finely divided clay has a particle-size distribution of 100 percent through a standard 100 mesh sieve and at least 50 percent through a standard 325 mesh sieve.

6. A process for refining color-unstable undried phenols obtained by the thermal treatment of hydrocarbonaceous materials and which are normally unsuitable in the unrefined state for forming color-stable phosphoric acid esters having a color below 60 Hazen, which comprises intimately contacting said undried phenols having a boiling range of at least 30° C. within the temperature range of 180 and 230° C. in a batch contactor at a temperature between 150 and 200° C. with from 3 to 20 percent by weight of a finely divided acid-activated non-swellable montmorillonitic clay for a period of time between 10 minutes and 3 hours, said clay having a particle-size distribution of 100 percent through a standard 100 mesh sieve and at least 50 percent through a standard 325 mesh sieve, filtering the mixture of clay and phenols to obtain a filter cake and a first filtrate, passing steam through said filter cake to obtain a second filtrate for recycle in the process, distilling said first filtrate, and recovering therefrom as a distillate fraction refined color-stable dried phenols suitable for forming colorless, color-stable tricresyl phosphate esters having a color below 60 Hazen.

References Cited by the Examiner

UNITED STATES PATENTS

| 2,113,951 | 4/38 | Shuman. | |
| 2,247,523 | 7/41 | Schick et al. | 260—627 |
| 2,446,250 | 8/48 | Shuman | 260—621 |
| 2,530,772 | 11/50 | Johnson. | |
| 2,553,538 | 5/51 | Arnold | 260—624 |
| 2,744,938 | 5/56 | Urban | 260—621 XR |

OTHER REFERENCES

Encyclop. Chem. Tech., vol. 4 (1949), page 28.

JOSEPH R. LIBERMAN, *Primary Examiner.*

LEON ZITVER, HAROLD G. MOORE, *Examiners.*